Aug. 17, 1965  W. B. CHAMBERS  3,200,661
VARIABLE DIAMETER PULLEY
Filed July 12, 1963
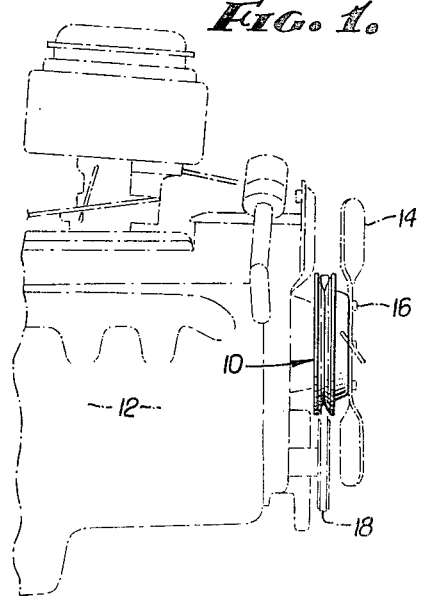
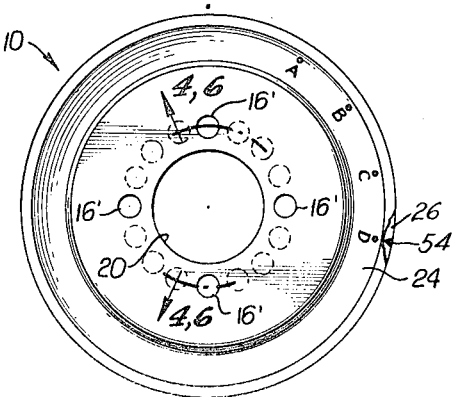
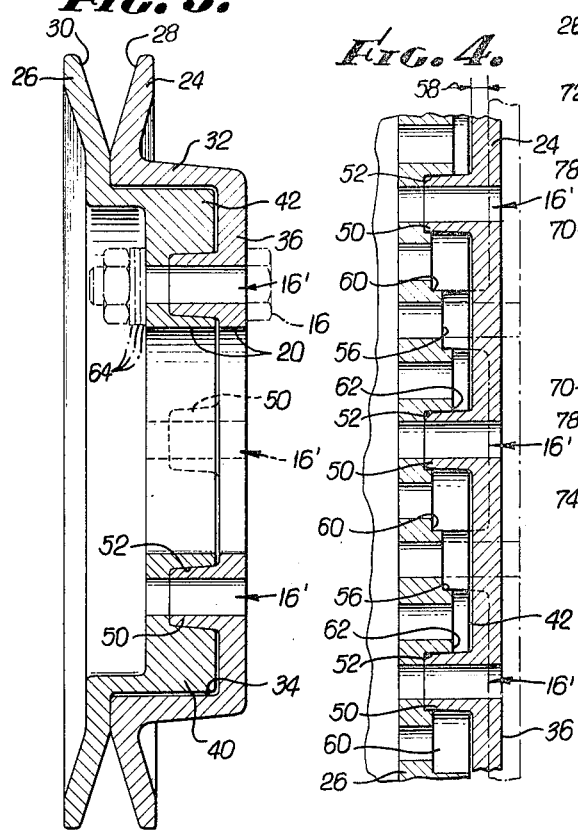
INVENTOR.
WILLIE B. CHAMBERS
BY
Nilsson, Robbins & Anderson
ATTORNEYS.

United States Patent Office 3,200,661
Patented Aug. 17, 1965

3,200,661
VARIABLE DIAMETER PULLEY
Willie Bill Chambers, 606 Edgewood Ave.,
Inglewood, Calif.
Filed July 12, 1963, Ser. No. 294,501
6 Claims. (Cl. 74—230.17)

This invention relates generally to power transmitting machines and more particularly to a pulley having effectively an adjustable diameter.

Flexible and versatile coupling between rotary shafts of a machine is often achieved by belt and pulley arrangements. In this manner the rotary mechanical advantage may be set to a predetermined level by merely selecting pulleys with properly related diameters, the relative angular velocity of the two shafts being directly proportional to the ratio of pulley diameters.

The relative angular velocity of such coupled shafts is in many systems critical, either in a mechanical or economic sense. An example of the latter is a feed belt system used to drive a cooling fan in internal combustion engines for automobiles. The angular velocity of the fan must be designed to be adequate for the most demanding of "normal" driving conditions such as summer driving under a load in southern areas. Such a design criteria results inherently in wasted energy expended by the fan in most of the automobile's normal service. The overall result then is an economic waste of fuel and a reduction in horsepower available at the drive shaft. It may generally be considered that five to ten horsepower is expended in driving the fan of a water cooled automobile engine and even more for an air cooled engine; because of the lack of optimization, major portions of the power is wasted in unused air motion. An extreme example of such waste which is customarily ignored by owners of water cooled engines is that typically at driving velocities of more than about 40 miles per hour, a full ten percent of the engine's output is used to drive a fan which is substantially redundant and useless in the face of the already existing flow of air through the radiator and over the engine. It is not necessarily an object of the present invention to solve this problem; it is presented merely to point out the magnitude of waste which is unknowingly tolerated by automobile owners and operators.

It is however an object of the present invention to reduce substantially the magnitude of wasted engine horsepower in driving its cooling fan.

Although the present invention finds particularly useful application in the field of engine cooling and much of the discussion of examples herein is directed thereto for purposes of clarity, it is stressed that the invention is not limited to such uses. For example, given an electric motor with a limited maximum input current and a belt driven rotary machine, with the requirement that the machine be run, under certain complex load conditions, at maximum angular velocity, while not exceeding the maximum input current to motor; the problem can be solved by selecting or varying the effective diameter of one or more of the coupling pulleys.

With the advent of V-belts and pulleys wherein the driving contact between belt and pulley is along a pair of axially spaced conical surfaces, as opposed to a simple outer cylindrical flat belt engaging surface, it has become feasible to effect a variable diameter pulley by providing means to adjust the magnitude of axial spacing of its conical surfaces.

However, attempts in the past to provide such an adjustable pulley have resulted in devices which are in some cases mechanically complex and consequently unwieldy, expensive, or relatively unreliable, for long-run use. Other prior art examples which are mechanically more simple are typically difficult to adjust, unstable in their adjustment, relatively fragile, or impossible of accurate indication of pulley diameter.

A further disadvantage of prior are adjustable V-pulleys is that typically only one of the conical surfaces is adapted to move. This causes an axial shifting of the belt centerline which in turn causes loss of alignment in the belt pulley system with consequent undue belt and bearing wear.

Accordingly, in addition to the object indicated above; the objects of the present invention include the providing of an adjustable V-pulley which is not subject to these and other disadvantages of the prior art.

It is another object to provide such an adjustable V-pulley which is exceedingly readily adjustable in discrete steps, with associated direct indications, to a plurality of different diameters.

It is another object to provide such a pulley which may consist of only two relatively simple and rugged pieces which may be inexpensively die-cast.

It is another object to provide a variable diameter pulley which automatically compensates axially to preclude any incumbent axial shifting of the belt center with adjustment of the pulley diameter.

Briefly in accordance with one example of the present invention these and other objects are achieved in a pulley which includes two juxtaposed disk members each having an outer truncated conical belt engaging surface. One of the disk members has a set of angularly spaced protuberances which fit into a set of similarly angularly spaced female receptacles in the other disk member in a manner whereby the depth of the receptacles determines the magnitude of the axial spacing of the conical surfaces.

In the angular spacing between the receptacles another set of receptables is provided which have a different depth and which receive the protuberances if the two disk members are axially dissambled, one of them rotated appropriately, and then reassembled. A number of such sets of receptacles may be provided, which number depends upon the available space between individual ones of the first set of receptacles.

Further details of these and other novel features and their principles of operation as well as additional objects and advantages of the invention will become apparent and be best understood from a consideration of the following description taken in connection with the accompanying drawing which is presented by way of illustrative example only and in which:

FIG. 1 is an elevational view of a variable diameter pulley shown affixed to the cooling system of a water cooled internal combustion engine in accordance with the principles of the present invention;

FIG. 2 is a frontal view of the pulley of FIG. 1;

FIG. 3 is a sectional view of one embodiment of the pulley of FIG. 1 taken along the lines 3—3 thereof;

FIG. 4 is a different sectional view of a portion of the structure of FIGS. 2 and 3 taken along the lines 4—4 of FIG. 2;

FIG. 5 is a sectional view of an alternative embodiment of the structure of FIG. 2 taken along the lines 5—5 thereof; and FIG. 6 is a sectional view of a portion of the structure of FIGS. 2 and 5 taken along the lines 6—6 of FIG. 2.

Referring to the figures in more detail it is stressed that the particulars shown are by way of example and for purposes of illustrative discussion only and are presented in the cause of providing what is believed to be the most useful and readily understood description of the principles and structural concepts of the invention. Specifically the detailed showing is not to be taken as a limitation upon the scope of the invention which is defined by the appended claims forming, along with the drawing, a part of this specification.

In FIG. 1 an example of an adjustable V-pulley 10 is shown in combination with a liquid cooled internal combustion engine 12. A four-bladed cooling fan 14 and the pulley 10 are affixed to a shaft (not shown) by means of four tension members which may be in the form of threaded lugs 16 which pass through the fan 14 and the pulley elements 10 and are threaded into a flange or face plate affixed to the shaft, in a manner to compress these components firmly together axially. In this example the pulley 10 is shown as being driven, by means of a V-belt 18, by a second pulley affixed to the crankshaft, not shown, of the engine 12. It should be noted that the pulley 10, although it is shown here as a driven pulley, may be, as well, a driving pulley. It should also be noted that the invention is not limited to such applications with liquid cooled internal combustion engines. As indicated above it finds particularly useful application in air cooled automobile engines as well as in other machines of broad and general description.

Referring to the frontal view of the pulley 10 presented in FIG. 2 it may be seen that the pulley is formed with a central bore 20 for receiving the mounting shaft, not shown, and with four mounting bores 16' which are substantially evenly angularly spaced with their centers in a circle which is concentric with the axis of the pulley.

Referring now directly to FIG. 3, as well as collaterally to FIG. 2, it may be seen that FIG. 3 is a diametric cross sectional view, along a plane, of one particular embodiment of the pulley 10 which may be considered as shown generically in the previous figures. The adjustable pulley in the example of FIG. 3 includes a front pulley disk member 24 and a rear disk member 26. The disk members 24, 26 are in a sense juxtaposed and each includes a mutually opposing truncated conical belt engaging flange portion 28, 30 respectively.

The front disk member 24 includes a hollow tubular portion 32, the inner surface 34 of which is cylindrically concave. The end of the hollow tubular portion 32 which is opposite from the outer flange portion 28 is partially closed by an integrally formed end face plate portion 36.

The rear disk member 26 includes a forwardly extending cylindrical portion 40 the outer diameter of which and the axial length of which are of the character to be freely telescopically engageable within the hollow tubular portion 32 of the front pulley disk member 24. Again the end of the forwardly extending cylindrical portion 40 opposite from the outer belt engaging flange portion is in part closed by a face plate portion 42. Both of the disk members 24, 26 are centrally bored in register, as shown, to form the shaft engaging bore 20.

Affixed to the end face plate portion 36 of the front disk member 24 are a plurality of rearwardly extending spacer protuberances 50. Each of these spacer protuberances 50 in this example are of equal length and are dimensioned to be received by a like plurality of a set of spacer receptacles 52 which are formed in the manner of a counter bore into the front surface of the face plate portion 42 of the rear disk member 26. The depth of the counter bore forming the receptacles 52 is seen to determine the spacing of the V-belt engaging flange portions 28, 30. Each of the receptacles and protuberances are centrally bored, as shown, to form the four mounting bores 16'.

It may thus be seen from FIG. 3 that the two pulley disk members 26, 24 may telescope together to a degree determined by the depth of the spacer receptacles 52. That is, if the spacer receptacle had a depth less than those shown in FIG. 3, the length of the protuberances 50 would cause the front disk member to be disposed further forwardly than that shown, in a manner thusly to increase the spacing between the belt engaging flange portions 28, 30, thereby permitting a given belt to assume a smaller diameter which effectively decreases the diameter of the pulley 10. Accordingly, the receptacles 52, with a predetermined depth, provide one set of receptacles which when they receive the spacer protuberances 50 define an effective diameter setting for the pulley assembly.

In the sectional view of FIG. 4 which is taken along the circle on which the centers of the receptacles lie, a plurality of four sets of the spacer receptacles are shown each with a different depth of counter bore. Each of the sets of receptacles is angularly offset from the others so that when the two disk elements are telescoped apart, angularly shifted with respect to each other, and then telescoped back together with the protuberances 50 inserted into a different set of spacer receptacles, the effective diameter of the pulley is altered in a discrete, known step.

The discrete pulley diameter size steps, as described above, relate in a one to one relationship to the angular relationship between the two pulley disk members 24, 26. In FIG. 2 an indexing system, in accordance with this example of the invention, is illustrated for indicating in which of four possible discrete angular relationships the two pulley halves are disposed. A pointer marker 54 on the front, outer surface of the rear disk member 26 is disposed thereon in a cooperating relation with a set of four index marker dots labeled "A," "B," "C," "D" which are angularly equally spaced along the front outer edge of the front pulley disk member 24.

In operation, the operator or technician may place any one of the index marking dots angularly adjacent the pointer marker 54 and thereby obtain a particular, predetermined, effective pulley diameter. In addition an observer, by glancing at the assembled pulley, may "read" the effective pulley diameter by immediate, external inspection.

With specific reference to FIG. 4 the face plate portion 36 of the front disk member 24 is shown in two different positions; one in solid lines in which the protuberances 50 are shown inserted into the deepest spacer receptacles 52, and one in phantom lines showing the plate portion 36 rotated and with the protuberances 50 shown inserted into a set of receptacles, individual ones thereof being indicated at 56, which have been counter-bored from the front surface of the face plate portion 42 of the rear disk member to a lesser depth than have the receptacles 52. The axial displacement of the portion 36 with respect to the portion 42 is indicated by the length of the displacement arrow 58 which is also a direct measure of the increase in axial spacing between the belt engaging, truncated conical surfaces of the flange portions 28, 30.

Disposed angularly intermediate between the receptacles 52 and the receptacles 56 is a set of receptacles 60 whose depth of counter-bore is, in this example, intermediate between the depths of the counter-bores of the receptacles 52, 56, respectively. Similarly disposed angularly intermediate the sets of receptacles 52, 56 is a fourth set of spacer receptacles 62, whose depth of counter-bore is even less than that of the receptacles 56.

When the magnitude of the difference in counter-bore depth between adjacent ones of the set of receptacles is constant (for example if the difference between the receptacles 52 and 60 was 1/16 of an inch and that between 60 and 56 was 1/16 of an inch and that between 56 and 62 was 1/16 of an inch) compensation for the shifting in the center line of the belt as the pulley is adjusted from minimum to maximum diameter may be provided by inserting respectively either one, two, or three 1/32 inch compensating washers 64 over the mounting lugs 16 at the rear face of the plate portion 42, of the rear disk member 26. In practice, if the washers are used they would be inserted over each of the mounting lugs in an angularly symmetrical fashion and preferably not over merely one lugs as indicated in the figure for purposes of description.

Further in this example it may be seen that if the protuberances 50 are inserted into the deepest spacer receptacles 52, see FIG. 3, with three spacing compensator washers 64, the center line of the belt will be at approximately the same axial position as it will be when the washers are removed and the protuberances 50 are inserted into the shallowest spacer receptacles 62.

Referring to FIG. 5 an example of the invention is illustrated which is in most respects substantially similar to the embodiment as shown in connection with FIGS. 3 and 4. In particular the forward pulley disk member 24 may be identical to that shown in FIG. 3. Furthermore, the rear disk member 26' with its cylindrical portion 40' and face plate portion 42' with its set of spacer receptacles 52' counter-bored therein is substantially similar to the rear disk member 26 of the previous example.

In this embodiment, however, a set of compensator receptacles 70 are formed by a counter-boring of the mounting holes 16' from the rear of the face plate portion 42'. In addition a third telescoping compensator disk member 72 is provided in the form of a short cylindrical member having an outer diameter slightly smaller than the inner diameter of a large diameter counter-bore 74 relieved from the rear of the plate portion 42'. The forward end of the disk member 72 is partially closed by a plate portion 76 on the forward face of which are affixed a set of four compensator protuberances 78. These are similar in form and identical in number to the protuberances 50 extending rearwardly from the plate portion 36 of the forward pulley disk member. It may further be noted that individual ones of the protuberances 78 are preferably arranged to be in register axially with individual ones of the protuberances 50 so that the mounting lugs 16 will pass through both to hold the entire assembly in compression when it is mounted for use.

Referring to FIG. 6 the spacer protuberances 50 extending rearwardly from the plate portion 36 of the forward disk member are shown in engagement with the deepest set of spacer receptacles 52'. In this view the other three sets of spacer receptacles 60', 56', 62', formed by counter-bores into the front surface of the face plate portion 42' are indicated similarly to the showing of FIG. 4. In like manner the compensator receptacles 70, counter-bored into the rear surface of the plate member 42', are shown. Also shown, in gradually increasing depth, are three other sets of compensator receptacles 80, 82, 84. As indicated in connection with the compensator washers 64 of FIG. 3, the step height between adjacent ones of the receptacles 70, 80, 82, 84, is one-half that between the spacer receptacles on the forward face of the plate member 42' if the latter steps are all equal to each other. If the steps in the spacer receptacles are not equal to each other, then the depth of the compensator receptacles is separately computed to provide the result that as the plate portions 42' is rotated with respect to the protuberance bearing members (72, 24), the conical belt engaging surfaces of the outer flange portions increase or decrease their axial separation, without changing their center line, or in other words, the axial position of a radical plane of symmetry between the two conical surfaces.

There have thus been disclosed a number of examples and structural aspects of the novel adjustable V-pulley of the present invention which achieve the objects and exhibit the advantages discussed hereinabove. In the examples given, the use of a V-type belt has been presumed for the sake of brevity of discussion. It should be noted however that the invention is equally adaptable for use with an A-section belt.

It should also be noted that although the examples given presume the use of four-mounting lugs and four sets of spacer receptacles formed in the rear pulley disk member any number of mounting lugs could be used and, within practical limits, any number of sets of angularly offset sets of receptacles could be provided without departing from the scope of the invention. In this connection constructed examples of the invention have included the case where with two mounting holes eight different sets of spacing receptacles were provided with the resultant capability of eight different pulley diameters. In another example in which three mounting holes were provided, five different sets of spacer receptacles were utilized.

What is claimed is:

1. A variable diameter V-pulley comprising:
   first and second juxtaposed pulley disk members having mutually opposed truncated conical V-belt engaging surfaces,
   said first disk member having a plurality, forming a set, of protuberances extending axially toward said second disk member and being substantially equally angularly spaced along a circle concentric with the axis of said pulley,
   said second disk member having a like plurality, forming a first set, of female receptacles formed in the face thereof exposed toward said first disk member, said first set of receptacles being angularly spaced and radially disposed substantially similarly to said protuberances, each of said receptacles of said first set having dimensions for receiving one of said protuberances to a predetermined depth; and
   at least one additional set of receptacles formed in said second disk member radially similarly to those of said first set but angularly offset and spaced therefrom, said additional set of receptacles being formed with dimensions for receiving said protuberances to a second predetermined depth,
   whereby the axial spacing of said conical V-belt engaging surfaces is adjustable depending upon which set of said receptacles said protuberances are received into,
   one of said disk members including a convex short cylindrical portion formed radially within said conical surface and being concentric therewith, and the other of said disk members including a concave, short cylindrical portion adapted to fit telescopically over said convex cylindrical portion when said protuberances and a set of said receptacles are engaged.

2. A variable diameter V-pulley comprising:
   first and second juxtaposed pulley disk members having mutually opposed truncated conical V-belt engaging surfaces,
   said first disk member having a plurality, forming a set, of protuberances extending axially toward said second disk member and being substantially equally angularly spaced along a circle concentric with the axis of said pulley,
   said second disk member having a like plurality, forming a first set, of female receptacles formed in the face thereof exposed toward said first disk member, said first set of recetpacles being angularly spaced and radially disposed substantially similarly to said protuberances, each of said receptacles of said first set having dimensions for receiving one of said protuberances to a predetermined depth; and at least one additional set of receptacles formed in said second disk member radially similarly to those of said first set but angularly offset and spaced therefrom, said additional set of receptacles being formed with dimensions for receiving said protuberances to a second predetermined depth,
   whereby the axial spacing of said conical V-belt engaging surfaces is adjustable depending upon which set of said receptacles said protuberances are received into,
   said protuberances and receptacles being formed with axial bores and counterbores therethrough to provide passageway for tension members for compressing axially said protuberances and a set of said receptacles into positive contact.

3. An adjustable diameter V-pulley having an axis and comprising:
   a first disk member including
      an end circular first face plate portion,
      a short hollow portion having an inner cylindrical surface with a predetermined inner diameter and being disposed concentrically about said axis and said face plate and affixed to the latter, and
      a conical belt engaging first flange portion affixed to said hollow portion and extending outwardly therefrom, said flange and plate portions being affixed to opposite ends of said hollow portion;
   a second disk member including
      a second face plate portion,
      a short cylindrical portion having a predetermined outer diameter which is slightly less than said predetermined inner diameter of said short hollow portion of said first disk member, and
      an outer conical belt engaging second flange portion affixed to said short cylindrical portion, said second flange and plate portions being affixed to opposite ends thereof,
      said cylindrical portion of said second disk member being adapted to fit axially, telescopically into said hollow portion of said first disk member, whereby the axial separation of said first and said second plate portions determines the axial spacing of said V-belt engaging first and second flange portions which cooperatively form a belt engaging V;
   spacing means affixed to said first and second disk members for effecting said axial spacing depending upon the relative angular orientation of said first and second disk members about said axis,
      said spacing means including a set of angularly equally spaced on a circle concentric about said axis, protuberances disposed on one of said face plate portions, and a plurality of sets of female spacing receptacles disposed on the opposing face of the other of said plate portions, each of said sets of receptacles having dimensions for receiving said protuberances to a predetermined depth, different sets to different depths, and said different sets being angularly offset from each other about said axis; and
   indicator means affixed to at least one of said disk members for indicating the effective diameter of said pulley as a function of said relative angular orientation.

4. The invention according to claim 3 in which said pensating means includes a third disk element having a third face plate portion and adapted to fit telescopically within said short cylindrical portion of said second disk member and which has a second set of protuberances, individual ones thereof being aligned one to one with those of said first set of protuberances; and a plurality of sets of female compensator receptacles in said second face plate portion on the face thereof opposite from said first disk member, said compensator sets of receptacles being angularly offset from each other as are those of said sets of spacing receptacles, and being formed with different depths for receiving said second set of protuberances.

5. An adjustable diameter V-pulley having an axis and comprising:
   a first disk member including
      an end circular first face plate portion,
      a short hollow portion having an inner cylindrical surface with a predetermined inner diameter and being disposed concentrically about said axis and said face plate and affixed to the latter, and
      a conical belt engaging first flange portion affixed to said hollow portion and extending outwardly therefrom, said flange and plate portions being affixed to opposite ends of said hollow portion;
   a second disk member including
      a second face plate portion,
      a short cylindrical portion having a predetermined outer diameter which is slightly less than said predetermined inner diameter of said short hollow portion of said first disk member, and
      an outer conical belt engaging second flange portion affixed to said short cylindrical portion, said second flange and plate portions being affixed to opposite ends thereof,
      said cylindrical portion of said second disk member being adapted to fit axially, telescopically into said hollow portion of said first disk member, whereby the axial separation of said first and said second plate portions determines the axial spacing of said V-belt engaging first and second flange portions which cooperatively form a belt engaging V;
   spacing means affixed to said first and second disk members for effecting said axial spacing depending upon the relative angular orientation of said first and second disk members about said axis,
      said spacing means including a set of angularly equally spaced on a circle concentric about said axis, protuberances disposed on one of said face plate portions, and a plurality of sets of female spacing receptacles disposed on the opposing face of the other of said plate portions, each of said sets of receptacles having dimensions for receiving said protuberances to a predetermined depth, different sets to different depths, and said different sets being angularly offset from each other about said axis; and
   means for compensating for the different axial spacing of said conical first and second flange portions whereby the relative axial displacement of one of said disk members is compensated for by an axial displacement of the other said disk member to cancel any axial displacement of the mid point between said conical first and second flange portions.

6. The invention according to claim 5 in which the depths of said compensator receptacles are different by steps of half the magnitude of those of said spacing receptacles.

References Cited by the Examiner
FOREIGN PATENTS 1,014,705    6/52    France.

DON A. WAITE, *Primary Examiner.*